United States Patent
Jiang et al.

(10) Patent No.: US 8,346,316 B2
(45) Date of Patent: Jan. 1, 2013

(54) PERSONAL DIGITAL ASSISTANT

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 443 days.

(21) Appl. No.: 12/384,328

(22) Filed: Apr. 2, 2009

(65) Prior Publication Data

US 2010/0048250 A1 Feb. 25, 2010

(30) Foreign Application Priority Data

Aug. 22, 2008 (CN) .......................... 2008 1 0142023

(51) Int. Cl.
*H04M 1/00* (2006.01)

(52) U.S. Cl. ..................... 455/575.1; 455/566; 345/211; 345/173

(58) Field of Classification Search .......... 345/173–179; 445/23–25, 49–51; 455/566
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,071,927 B2 | 7/2006 | Blanchard | |
| 7,084,933 B2 | 8/2006 | Oh et al. | |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003,32(8).

(Continued)

*Primary Examiner* — Shawki Ismail
*Assistant Examiner* — Christopher Lo
(74) *Attorney, Agent, or Firm* — Altis Law Group, Inc.

(57) ABSTRACT

A personal digital assistant includes a body, and a touch panel. The body includes a display screen. The touch panel is located on a surface of the display screen. The touch panel includes at least one transparent conductive layer including a carbon nanotube layer.

18 Claims, 10 Drawing Sheets

U.S. PATENT DOCUMENTS

| | | |
|---|---|---|
| 7,348,966 B2 | 3/2008 | Hong et al. |
| 7,355,592 B2 | 4/2008 | Hong et al. |
| 7,532,182 B2 | 5/2009 | Tseng et al. |
| 7,535,462 B2 * | 5/2009 | Spath et al. .................. 345/174 |
| 7,593,004 B2 | 9/2009 | Spath et al. |
| 7,630,040 B2 | 12/2009 | Liu et al. |
| 7,662,732 B2 * | 2/2010 | Choi et al. .................. 438/800 |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 * | 11/2010 | Sano et al. .................. 345/173 |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kawase et al. |
| 2005/0209392 A1 | 9/2005 | Luo et al. |
| 2006/0010996 A1 | 1/2006 | Jordan et al. |
| 2006/0022221 A1 | 2/2006 | Furukawa et al. |
| 2006/0044284 A1 | 3/2006 | Tanabe |
| 2006/0077147 A1 * | 4/2006 | Palmateer et al. .............. 345/85 |
| 2006/0097991 A1 * | 5/2006 | Hotelling et al. ............. 345/173 |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 * | 12/2006 | Spath et al. .................. 345/173 |
| 2006/0274049 A1 | 12/2006 | Spath et al. |
| 2006/0275956 A1 | 12/2006 | Konesky |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0085838 A1 | 4/2007 | Ricks et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0007535 A1 | 1/2008 | Li |
| 2008/0029292 A1 | 2/2008 | Takayama et al. |
| 2008/0048996 A1 | 2/2008 | Hu et al. |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 | 8/2008 | Kent et al. |
| 2008/0238882 A1 * | 10/2008 | Sivarajan et al. ............ 345/174 |
| 2008/0248235 A1 | 10/2008 | Feng et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | 61-283918 | 12/1986 |
| JP | S62-63332 | 3/1987 |
| JP | 62-139028 | 6/1987 |
| JP | S62-182916 | 8/1987 |
| JP | S62-190524 | 8/1987 |
| JP | 1-214919 | 8/1989 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002519754 | 7/2002 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |

| | | |
|---|---|---|
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Kazuhiro Noda, Kohtaro Tanimura, Production of Transparent Conductive Films with Inserted SiO2 Anchor Layer, and Application to a Resistive Touch Panel, Electronics and Communications in Japan, Jul. 2001, p. 39-45, vol. 84.

Yu Xiang, Technique of Touch Panel & the Production of Resistance-type Touch Panel Insulation Dot, Journal of Longyan Teachers College, p. 25-26, vol. 22, No. 6, 2004.

Mei Zhang etal., "Strong Transparent, Multifunctional, Carbon Nanotube Sheets", Science, America, AAAS, vol. 309, pp. 1215-1219, Aug. 19, 2005.

Ri Kurosawa, "Technology Trends of Capacitive Touch Panel", Technology and Development of Touch Panel, Amc, First Impression, pp. 54-64, Dec. 27, 2004.

Yagasaki Takuya, Nakanishi Rou, "Resistance Film Type Touch Panel", Technologies and Developments of Touch Panels, Amc, First Impression, pp. 80-93, Dec. 27, 2004.

Yoshikazu Nakayama, "Technology Development of CNT Long Yarns and CNT Sheets", Nano Carbon Handbook, Japan TSN Inc, pp. 261-266, Jul. 17, 2007.

George Gruner, "Carbon Nanonets Spark New Electronics", Scientific American, pp. 76-83, May, 2007.

Susuki et al. "Investigation of physical and electric properties of silver pastes as binder for thermoelectric materials". Review of Scientific Instruments,76,(2005);pp. 023907-1 to 023907-5.

Fan et al. "Self-Oriented Regular Arrays of Carbon Nanotubes and Their Field Emission Properties". Science, vol. 283, (1999); pp. 512-514.

Wu et al."Transparent, Conductive Carbon Nanotube Films". Science,vol. 305,(2004);pp. 1273-1276.

ASM Handbook."vol. 2 Properties and Selection: Nonferrous Alloys and Special-Purpose Materials".Apr. 2007; pp. 840-853.

R Colin Johnson, "Carbon nanotubes aim for cheap, durable touch screens", Aug. 2007 http://psroc.phys.ntu.edu.tw/bimonth/v27/615.pdf.

Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner

PERSONAL DIGITAL ASSISTANT

RELATED APPLICATIONS

This application is related to applications entitled, "TOUCH PANEL", U.S. application Ser. No. 12/286,266, filed Sep. 29, 2008; "TOUCH PANEL", U.S. application Ser. No. 12/286,141, filed Sep. 29, 2008; "TOUCH PANEL AND DISPLAY DEVICE USING THE SAME", U.S. application Ser. No. 12/286,189, filed Sep. 29, 2008; "TOUCH PANEL AND DISPLAY DEVICE USING THE SAME", U.S. application Ser. No. 12/286,181, filed Sep. 29, 2008; "TOUCH PANEL AND DISPLAY DEVICE USING THE SAME", U.S. application Ser. No. 12/286,176, filed Sep. 29, 2008; "TOUCH PANEL AND DISPLAY DEVICE USING THE SAME", U.S. application Ser. No. 12/286,166, filed Sep. 29, 2008; "TOUCH PANEL AND DISPLAY DEVICE USING THE SAME", U.S. application Ser. No. 12/286,178, filed Sep. 29, 2008; "TOUCH PANEL AND DISPLAY DEVICE USING THE SAME", U.S. application Ser. No. 12/286,148, filed Sep. 29, 2008; "TOUCHABLE CONTROL DEVICE", U.S. application Ser. No. 12/286,140, filed Sep. 29, 2008; "TOUCH PANEL AND DISPLAY DEVICE USING THE SAME", U.S. application Ser. No. 12/286,154, filed Sep. 29, 2008; "TOUCH PANEL AND DISPLAY DEVICE USING THE SAME", U.S. application Ser. No. 12/286,216, filed Sep. 29, 2008; "TOUCH PANEL AND DISPLAY DEVICE USING THE SAME", U.S. application Ser. No. 12/286,152, filed Sep. 29, 2008; "TOUCH PANEL AND DISPLAY DEVICE USING THE SAME", U.S. application Ser. No. 12/286,146, filed Sep. 29, 2008; "TOUCH PANEL AND DISPLAY DEVICE USING THE SAME", U.S. application Ser. No. 12/286,145, filed Sep. 29, 2008; "TOUCH PANEL, METHOD FOR MAKING THE SAME, AND DISPLAY DEVICE ADOPTING THE SAME", U.S. application Ser. No. 12/286,155, filed Sep. 29, 2008; "TOUCH PANEL AND DISPLAY DEVICE USING THE SAME", U.S. application Ser. No. 12/286,179, filed Sep. 29, 2008; "TOUCH PANEL, METHOD FOR MAKING THE SAME, AND DISPLAY DEVICE ADOPTING THE SAME", U.S. application Ser. No. 12/286,228, filed Sep. 29, 2008; "TOUCH PANEL AND DISPLAY DEVICE USING THE SAME", U.S. application Ser. No. 12/286,153, filed Sep. 29, 2008; "TOUCH PANEL AND DISPLAY DEVICE USING THE SAME", U.S. application Ser. No. 12/286,184, filed Sep. 29, 2008; "METHOD FOR MAKING TOUCH PANEL", U.S. application Ser. No. 12/286,175, filed Sep. 29, 2008; "METHOD FOR MAKING TOUCH PANEL", U.S. application Ser. No. 12/286,195, filed Sep. 29, 2008; "TOUCH PANEL AND DISPLAY DEVICE USING THE SAME", U.S. application Ser. No. 12/286,160, filed Sep. 29, 2008; "TOUCH PANEL AND DISPLAY DEVICE USING THE SAME", U.S. application Ser. No. 12/286,220, filed Sep. 29, 2008; "TOUCH PANEL AND DISPLAY DEVICE USING THE SAME", U.S. application Ser. No. 12/286,227, filed Sep. 29, 2008; "TOUCH PANEL AND DISPLAY DEVICE USING THE SAME", U.S. application Ser. No. 12/286,144, filed Sep. 29, 2008; "TOUCH PANEL AND DISPLAY DEVICE USING THE SAME", U.S. application Ser. No. 12/286,218, filed Sep. 29, 2008; "TOUCH PANEL AND DISPLAY DEVICE USING THE SAME", U.S. application Ser. No. 12/286,1428, filed Sep. 29, 2008; "TOUCH PANEL AND DISPLAY DEVICE USING THE SAME", U.S. application Ser. No. 12/286,241, filed Sep. 29, 2008; "TOUCH PANEL, METHOD FOR MAKING THE SAME, AND DISPLAY DEVICE ADOPTING THE SAME", U.S. application Ser. No. 12/286,151, filed Sep. 29, 2008; "ELECTRONIC ELEMENT HAVING CARBON NANOTUBES", U.S. application Ser. No. 12/286,143, filed Sep. 29, 2008; and "TOUCH PANEL, METHOD FOR MAKING THE SAME, AND DISPLAY DEVICE ADOPTING THE SAME", U.S. application Ser. No. 12/286,219, filed Sep. 29, 2008.

BACKGROUND

1. Technical Field

The present disclosure relates to personal digital assistants and, particularly, to a carbon nanotube based personal digital assistant.

2. Discussion of Related Art

A typical personal digital assistant (PDA) includes a body, a display screen located on the body, and a touch panel located on the display screen. Different types of touch panels, including resistance, capacitance, infrared, and surface sound-wave types have been developed. Due to their high accuracy and low cost of production, resistance-type and capacitance-type touch panels have been widely used in PDAs.

Conventional resistance-type and capacitance-type touch panels employ conductive indium tin oxide (ITO) as transparent conductive layers. ITO layers are generally formed by the complicated mean of ion-beam sputtering. Additionally, ITO layers have poor wearability/durability, low chemical endurance, and cause uneven resistance across the touch panels. Thus, PDA touch panels employing ITO will have low sensitivity and short lifetime.

What is needed, therefore, is a PDA in which the above problems are eliminated or at least alleviated.

BRIEF DESCRIPTION OF THE DRAWINGS

Many aspects of the present PDA can be better understood with references to the following drawings. The components in the drawings are not necessarily drawn to scale, the emphasis instead being placed upon clearly illustrating the principles of the present PDA.

Corresponding reference characters indicate corresponding parts throughout the several views. The exemplifications set out herein illustrate at least one embodiment of the present PDA, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the present PDA.

Figure 1:
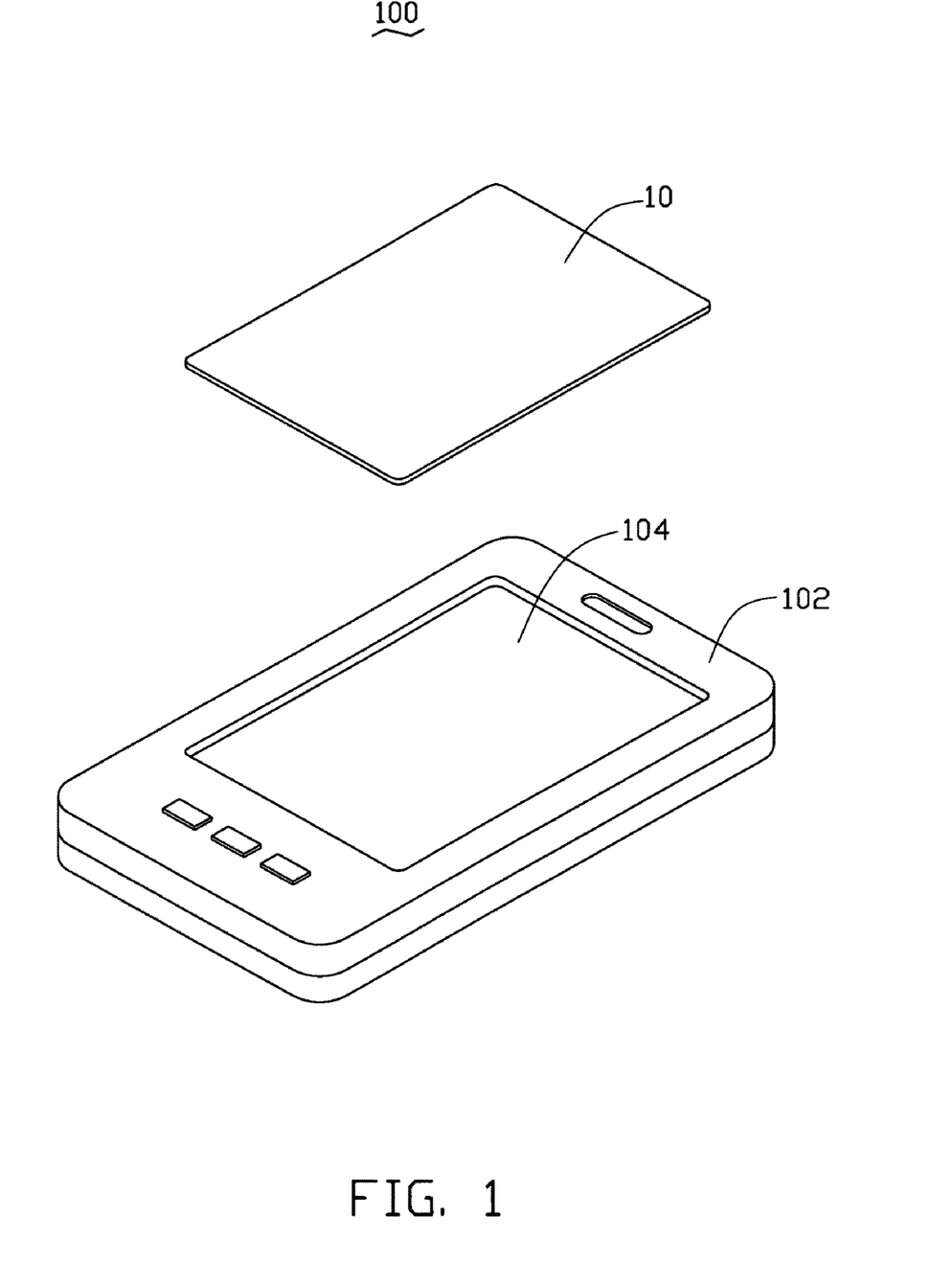
FIG. 1 is a schematic view of a PDA in accordance with a first embodiment.

Referring to FIG. 1, a personal digital assistant (PDA) 100 in accordance with a first embodiment is provided. The PDA 100 includes a body 102 and a touch panel 10. The body 102 includes a display screen 104. The touch panel 10 is located on a surface of the display screen 104.

Figure 2:
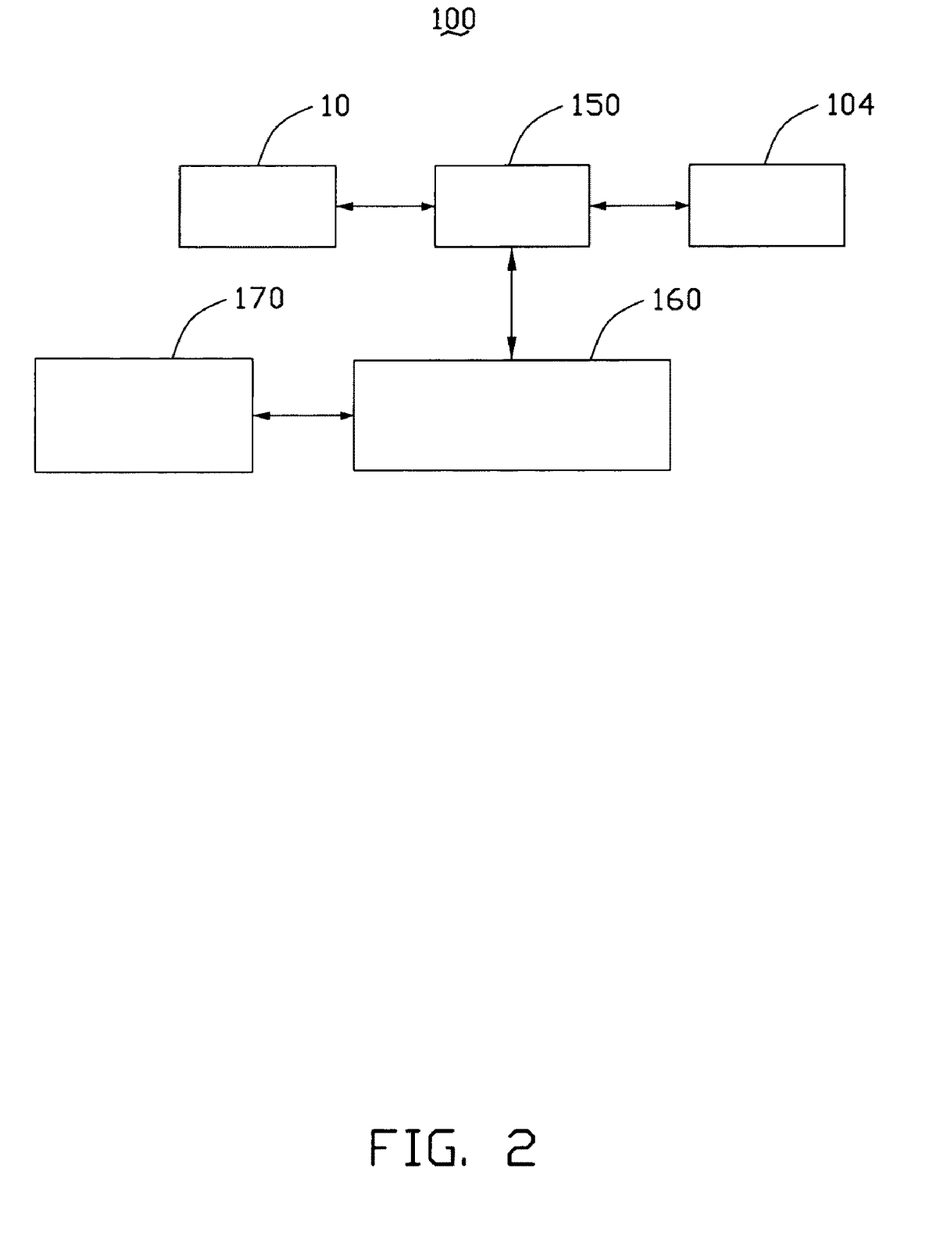
FIG. 2 is a control block diagram of the PDA of FIG. 1.

The body 102 further includes a central processing unit (CPU) (not shown), a storage unit (not shown) and a control unit (not shown). The central processing unit, the storage unit, the control unit, and the display screen 104 are all located in the body 102. The storage unit, the central processing unit and the control unit can be integrated on an integrated circuit board (not shown). Referring to FIG. 2, the storage unit 170 and the control unit 150 can be electrically connected to the central processing unit 160 by a conductive wire on the integrated circuit board. The display screen 104 and the touch panel 10 are connected to the control unit 150. The control unit 150 can include a touch panel control unit, a display screen control unit and other functional control units used to correspondingly control the touch panel 10, the display screen 104, and other functions. The storage unit 170 can be used to store data under control of the central processing unit. The storage unit 170 can further include a read-only memory, a random access memory, and/or a programmable memory.

The display screen 104 can be selected from a group consisting of liquid crystal display screen, filed emission display screen and plasma display screen, electroluminescent display screen and vacuum fluorescent display screen. In the present embodiment, the display screen 104 is a liquid crystal display screen. The display screen 104 is located in the shell of the body 102.

The touch panel 10 is configured for inputting signals. The touch panel 10 can be spaced from the display screen 104 or installed directly on the display screen 104. When the touch panel 10 is installed directly on the display screen 104, the touch panel 10 can be adhered on the display screen 104 by an adhesive or the touch panel 10 and the display screen 104 are integrated, such as using a same base. In the present embodiment, the touch panel 10 is installed directly on the display screen 104. Further, a keyboard (not shown) can be displayed on the display screen 104. The touch panel 10 can be a resistance-type or a capacitance-type touch panel.

Figure 3:
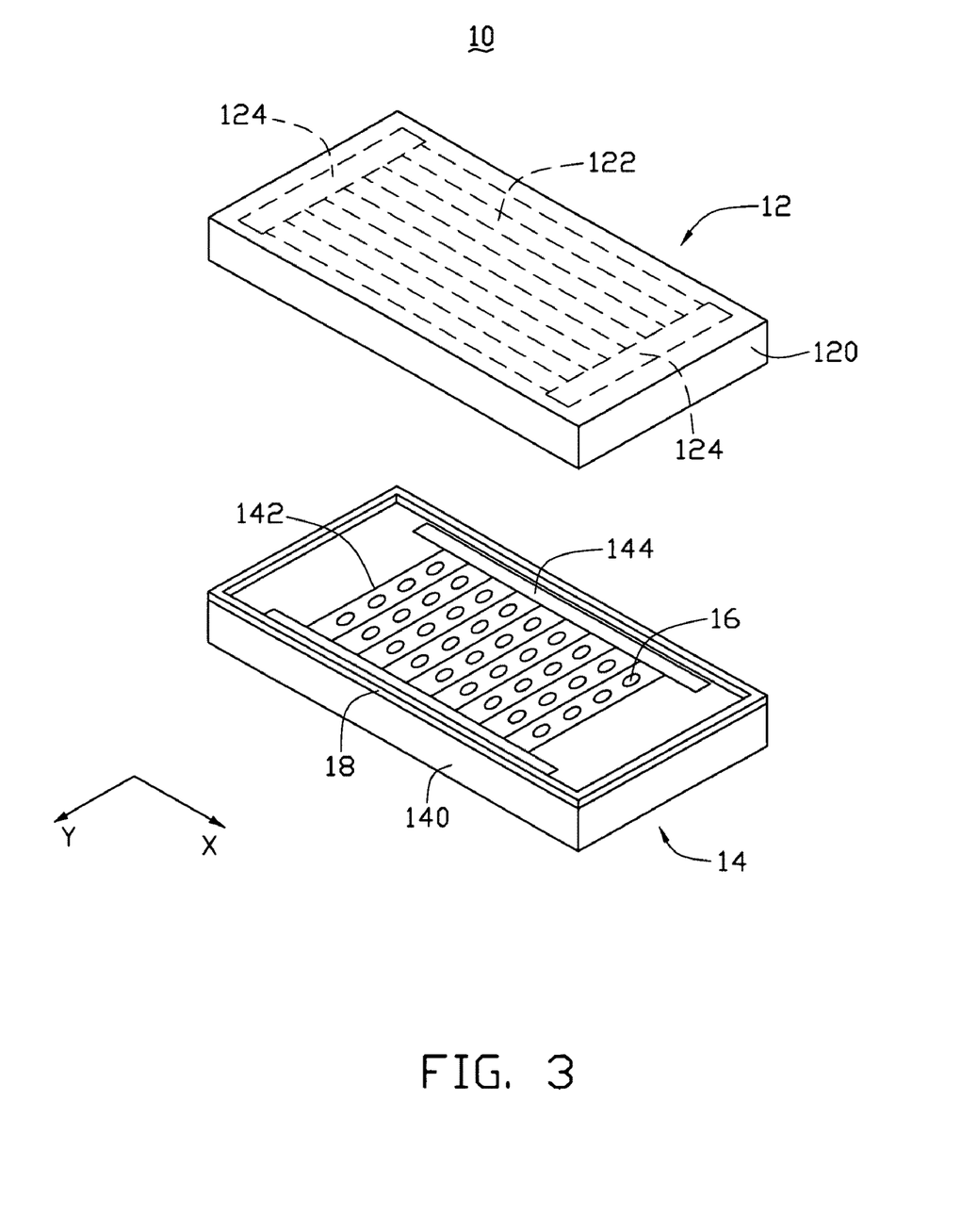
FIG. 3 is an exploded, isometric view of a touch panel in the PDA of FIG. 1.
Figure 4:
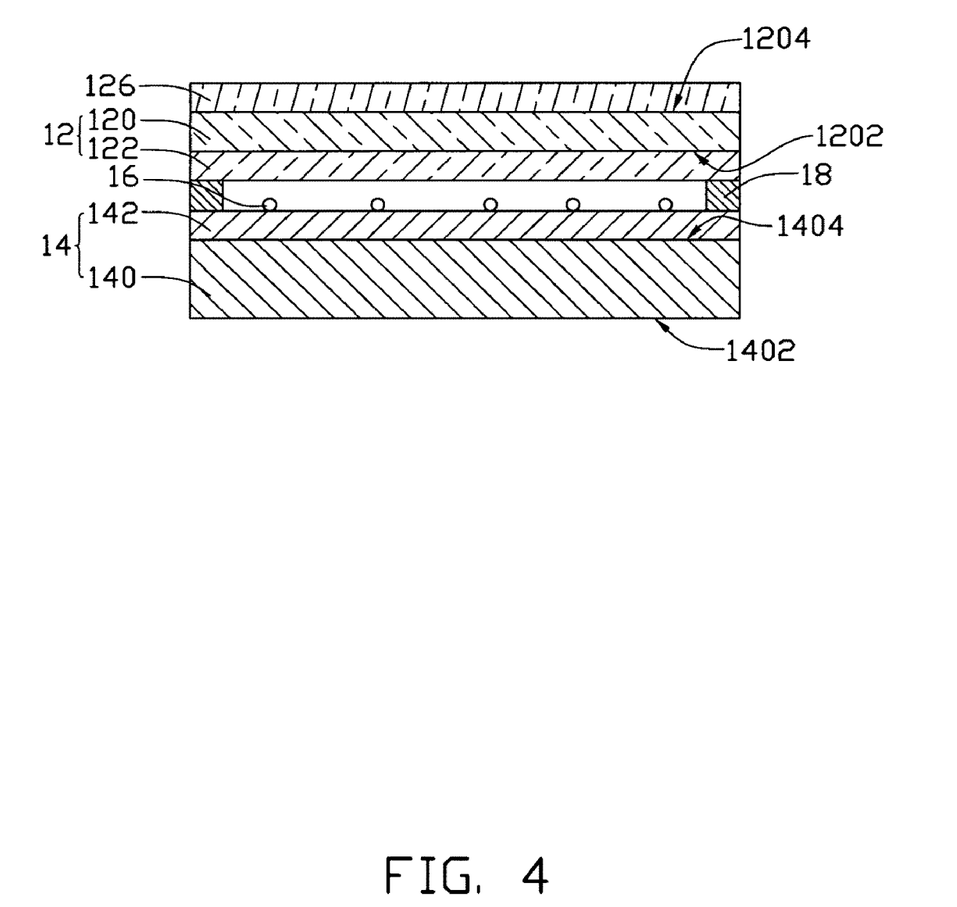
FIG. 4 cross-sectional view of the touch panel of FIG. 3 once assembled.

Referring to FIGS. 3 and 4, the touch panel 10 of the personal digital assistant 100 according to a first embodiment is a resistance-type touch panel. The touch panel 10 includes a first electrode plate 12, a second electrode plate 14, and a plurality of dot spacers 16 located between the first electrode plate 12 and the second electrode plate 14.

The first electrode plate 12 includes a first substrate 120, a first transparent conductive layer 122, and two first-electrodes 124. The first substrate 120 includes a first surface 1202 and a second surface 1204, each of which is substantially flat. The two first-electrodes 124 and the first transparent conductive layer 122 are located on the first surface 1202 of the first substrate 120. The two first-electrodes 124 are located separately on opposite ends of the first transparent conductive layer 122. A direction from one of the first-electrodes 124 across the first transparent conductive layer 122 to the other first electrode 124 is defined as a first direction. The two first-electrodes 124 are electrically connected to the first transparent conductive layer 122.

The second electrode plate 14 includes a second substrate 140 as a support structure for a second transparent conductive layer 142, and two second-electrodes 144. The second substrate 140 includes a first surface 1402 and a second surface 1404, each of which is substantially flat. The two second-electrodes 144 and the second transparent conductive layer 142 are located on the second surface 1404 of the second substrate 140. The two second-electrodes 144 are located separately on opposite ends of the second transparent conductive layer 142. A direction from one of the second-electrodes 144 across the second transparent conductive layer 142 to the other second-electrodes 144 is defined as a second direction, which is perpendicular to the first direction. The two second-electrodes 144 are electrically connected to the second transparent conductive layer 142. It is understood that when the touch panel 10 and the display screen 104 use a same base, the second transparent conductive layer 142 can be formed on a surface of the display screen 104 directly, and the second substrate 140 can be omitted.

The first substrate 120 is a transparent and flexible film or plate. The second substrate 140 is a transparent plate. The first-electrodes 124 and the second-electrodes 144 can be made of metal or any other suitable material. In the present embodiment, the first substrate 120 is a polyester film, the second substrate 140 is a glass plate, and the first-electrodes 124 and second-electrodes 144 are made of a conductive silver paste.

An insulative layer 18 is provided between the first and the second electrode plates 12 and 14. The first electrode plate 12 is located on the insulative layer 18. The first transparent conductive layer 122 is opposite to, but is spaced from, the second transparent conductive layer 142. The dot spacers 16 are separately located on the second transparent conductive layer 142. A distance between the second electrode plate 14 and the first electrode plate 12 can be in a range from about 2 to about 20 microns. The insulative layer 18 and the dot spacers 16 are made of, for example, insulative resin or any other suitable insulative material. Therefore, insulation between the first electrode plate 12 and the second electrode plate 14 is provided by the insulative layer 18 and the dot spacers 16. It is to be understood that the dot spacers 16 are optional, particularly when the touch panel 10 is relatively small. They serve as supports given the size of the span and the strength of the first electrode plate 12 and can be employed when needed.

A transparent protective film 126 is located on the second surface 1204 of the first substrate 120 of the first electrode plate 12. The material of the transparent protective film 126 can be selected from a group consisting of silicon nitrides, silicon dioxides, benzocyclobutenes, polyester films, and polyethylene terephthalates. The transparent protective film 126 can be made of slick plastic and receive a surface hardening treatment to protect the first electrode plate 12 from being scratched when in use.

At least one of the first transparent conductive layer 122 and the second transparent conductive layer 142 includes a carbon nanotube layer. The carbon nanotube layer is substantially uniform in thickness and includes a plurality of carbon nanotubes uniformly distributed therein. The carbon nanotubes therein are orderly or disorderly distributed. Disordered carbon nanotubes indicate a structure with carbon nanotubes arranged along many different directions, and the number of the carbon nanotubes in different directions is almost the same (e.g. uniform disorder). Ordered carbon nanotubes indicate a structure with carbon nanotubes arranged in consistently systematic manner, e.g., the carbon nanotubes are arranged approximately along a same direction or have two or more sections arranged approximately along a same direction.

The carbon nanotube layer includes at least one carbon nanotube film. The carbon nanotube film can be an ordered film or a disordered film. In the disordered film, the carbon nanotubes are disordered. The disordered film can be isotropic. The disordered carbon nanotubes are entangled with each other and/or attracted by van der Waals attractive therebetween. The carbon nanotubes can be substantially parallel to a surface of the carbon nanotube film. In the ordered film, the carbon nanotubes are primarily oriented along a same direction. Alternatively, the carbon nanotube layer can include at least two carbon nanotube films that overlap and/or stacked with each other. An angle between the aligned directions of the carbon nanotubes in the two adjacent ordered carbon nanotube films ranges from more than or equal to 0 degrees to less than or equal to 90 degrees. The carbon nanotube layer also can include a plurality of coplanar carbon nanotube films. The plurality of coplanar carbon nanotube films can form a large area to make a large area touch panel. Carbon nanotubes in the carbon nanotube layer can be selected from a group consisting of single-walled, double-walled, and/or multi-walled carbon nanotubes. Diameters of the single-walled carbon nanotubes range from about 0.5 nanometers to about 50 nanometers. Diameters of the double-walled carbon nanotubes approximately range from about 1 nanometer to about 50 nanometers. Diameters of the multi-walled carbon nanotubes approximately range from about 1.5 nanometers to about 50 nanometers.

Alternatively, carbon nanotubes in the carbon nanotube film can be in sections that are primarily aligned along the same direction. The directions in the different sections can be the same or different.

Figure 5:
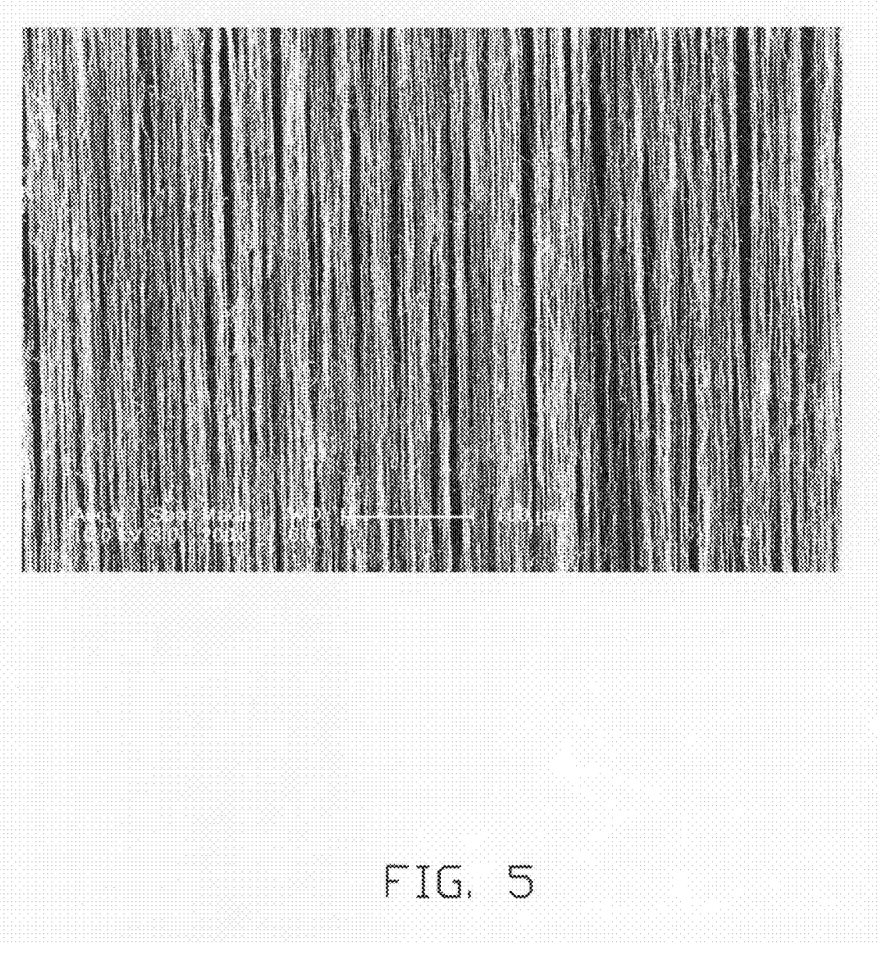
FIG. 5 is a Scanning Electron Microscope (SEM) image of a carbon nanotube film that can be utilized in the PDA.
Figure 6:
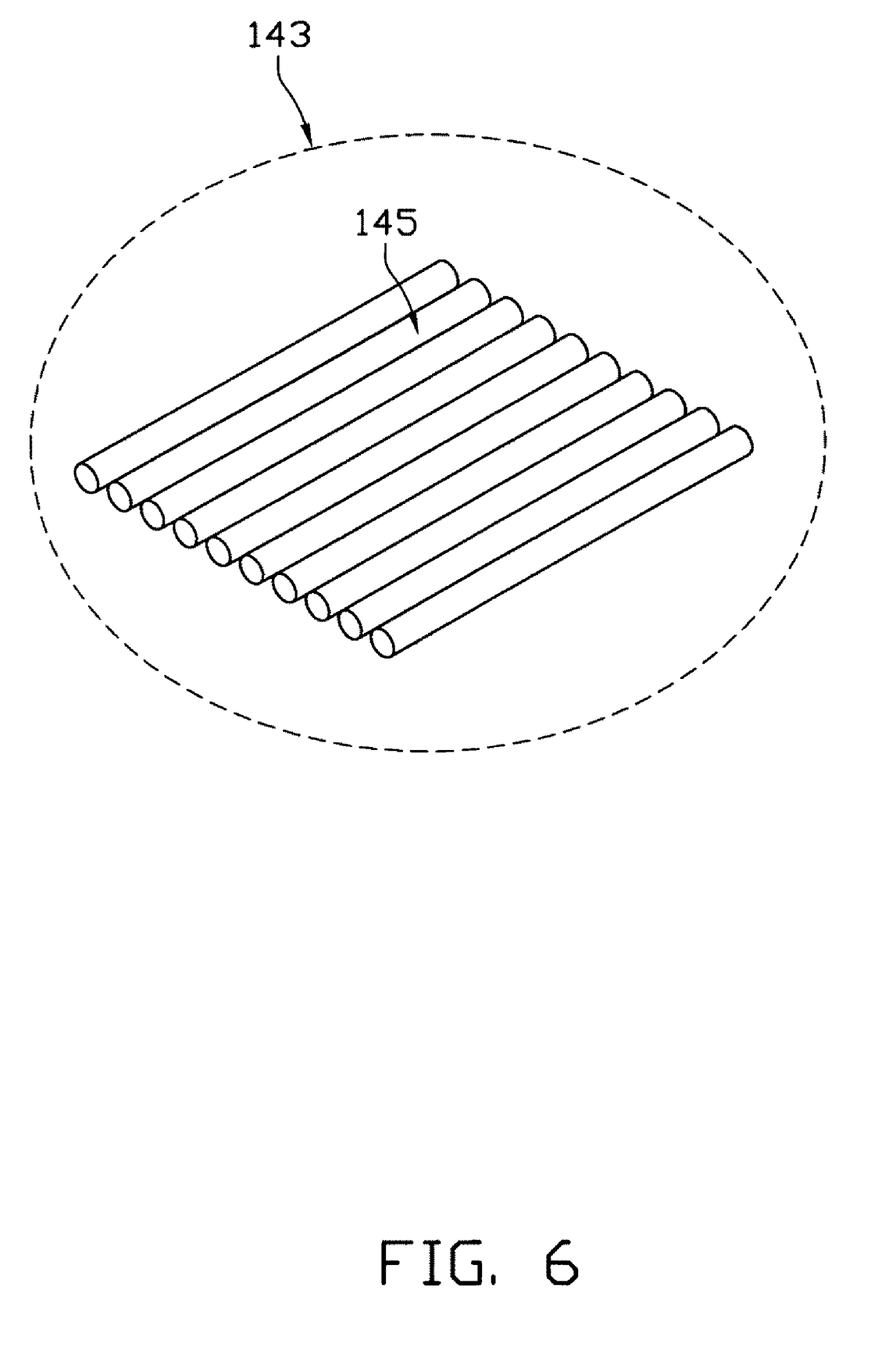
FIG. 6 is a schematic structural view of a carbon nanotube segment.

In one embodiment, the ordered film can be a drawn carbon nanotube film. The drawn carbon nanotube film can be formed by drawing from a carbon nanotube array. Referring to FIGS. 5 and 6, the drawn carbon nanotube film can include a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the drawn carbon nanotube film 143 are also oriented along a preferred orientation. A length and a width of the drawn carbon nanotube film can be arbitrarily set as desired. A thickness of the drawn carbon nanotube film is in a range from about 0.5 nanometers to about 100 micrometers.

The disordered film can be a flocculated carbon nanotube film. The flocculated carbon nanotube film includes a plurality of carbon nanotubes entangled with each other. A length of the carbon nanotubes can be a few microns to a few hundred microns. The adjacent carbon nanotubes are combined and entangled by van der Waals attractive force therebetween, thereby forming an entangled structure/microporous structure. It is understood that the carbon nanotube film is very microporous. Sizes of the micropores can be less than about 10 micrometers. It can be understood that carbon nanotube layer adopting the flocculated carbon nanotube film having a microporous structure can have a high transparency. Thus it is conducive to use in the touch panel 10.

The ordered film also can be a pressed carbon nanotube film. The carbon nanotubes in the pressed carbon nanotube film can be overlapped with each other. The adjacent carbon nanotubes are combined and attracted by van der Waals attractive force, thereby forming a free-standing structure. The pressed carbon nanotube film can be formed by pressing a carbon nanotube array formed on a substrate. An angle between a primary alignment direction of the carbon nanotubes and the substrate such that the angle is in a range from 0° to about 15°. The angle is closely related to pressure applied to the carbon nanotube array. The greater the pressure, the smaller the angle. In one embodiment, the carbon nanotubes in the carbon nanotube pressed film can parallel to the surface of the pressed carbon nanotube film when the angle is 0°.

In the present embodiment, the first transparent conductive layer 122 and the second transparent conductive layer 142 both include a drawn carbon nanotube film. The drawn carbon nanotube film includes a plurality of successive and oriented carbon nanotube segments joined end to end by the van der Waals attractive force therebetween. The carbon nanotubes in the first transparent conductive layer 122 can be oriented along a first direction, and the carbon nanotubes in the second transparent conductive layer 142 can be oriented along a second, different direction. It is to be understood that some variation can occur in the orientation of the nanotubes in the drawn carbon nanotube film as can be seen in FIG. 5. A thickness of the drawn carbon nanotube film ranges from about 0.5 nanometers to about 100 micrometers. A width of the drawn carbon nanotube film ranges from about 0.01 centimeters to about 10 meters.

When the touch panel 10 is installed directly on the display screen 104, the touch panel 10 can further include a shielding layer (not shown) located on the first surface 1402 of the second substrate 140. The material of the shielding layer can be indium tin oxide, antimony tin oxide, carbon nanotube film, or other conductive materials. In the present embodiment, the shielding layer is a carbon nanotube film. The shielding layer carbon nanotube film includes a plurality of carbon nanotubes 145, and the orientation of the carbon nanotubes 145 therein can be arbitrary or arranged along a same direction. The shielding layer carbon nanotube film is connected to ground and plays a role of shielding and, thus, enables the touch panel 10 to operate without interference (e.g., electromagnetic interference). Further, a passivation layer (not shown) can be further located on a surface of the shielding layer, on the side away from the second substrate 140. The material of the passivation layer can, for example, be silicon nitride or silicon dioxide. The passivation layer can protect the shielding layer 22 from chemical or mechanical damage.

Figure 7:
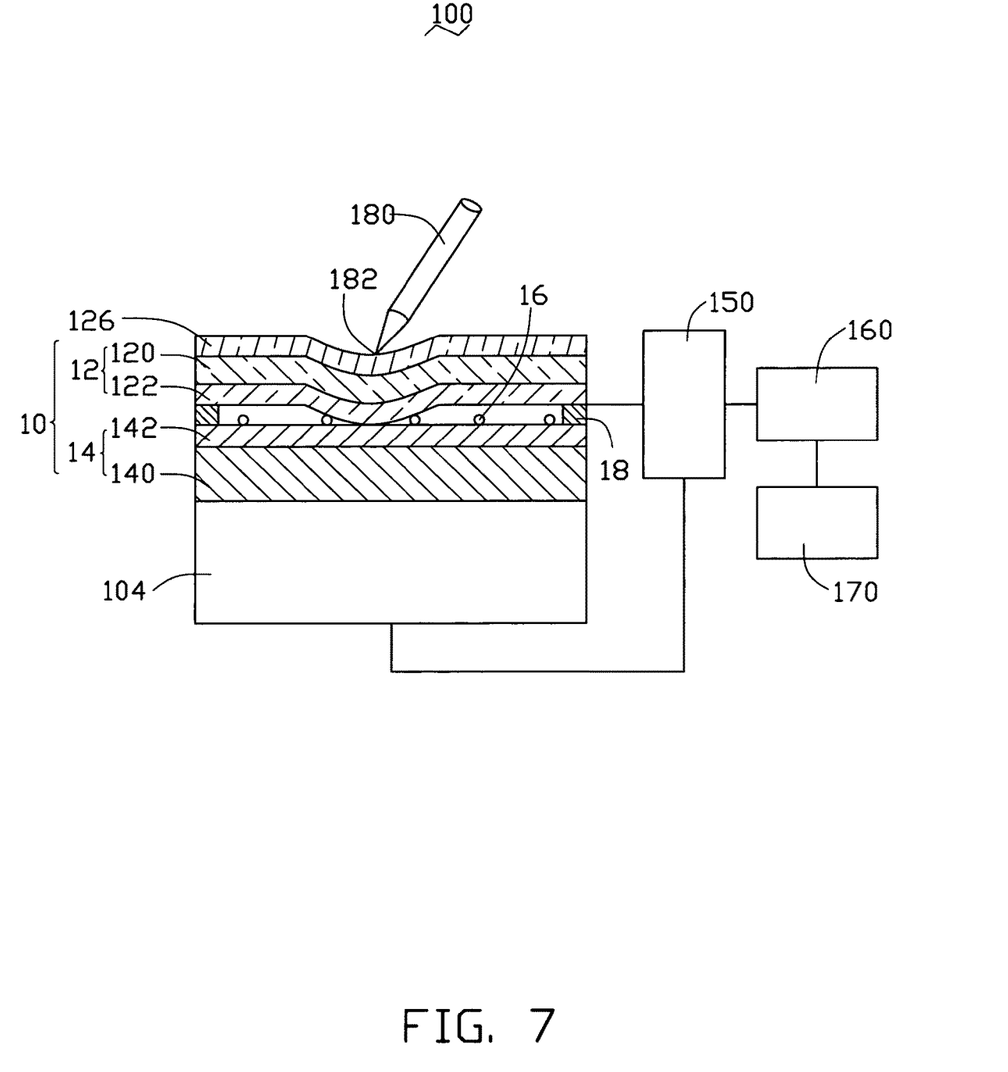
FIG. 7 is a schematic cross-sectional view of the touch panel of the first embodiment used with a display screen, showing operation of the touch panel with a touch tool.

Referring to FIG. 7, in the present embodiment, 5V are applied to each of the two first-electrodes 124 of the first electrode plate 12 and to each of the two second-electrodes 144 of the second electrode plate 14. A user operates the PDA 100 by pressing the first electrode plate 12 of the touch panel 10 with a finger, a pen/stylus 180, or the like while visually observing the display screen 104 through the touch panel 10. This pressing causes a deformation of the first electrode plate 12. The deformation of the first electrode plate 12 causes a connection between the first transparent conductive layer 122 and the second conduction layer 142 of the second electrode plate 14. Changes in voltages in the first direction of the first transparent conductive layer 142 and the second direction of the second transparent conductive layer 142 can be detected by the touch panel controller of the control unit 150. Then the control unit 150 transforms the changes in voltages into coordinates of the pressing point 182, and sends the coordinates of the pressing point 182 to the central processing unit 160. The central processing unit 160 retrieves the command corresponding to the pressing point 182 from the storage unit 170, and passes the command to the corresponding control unit of the control unit 150. The control unit 150 controls the display of the display screen 104 according to the command.

Figure 8:
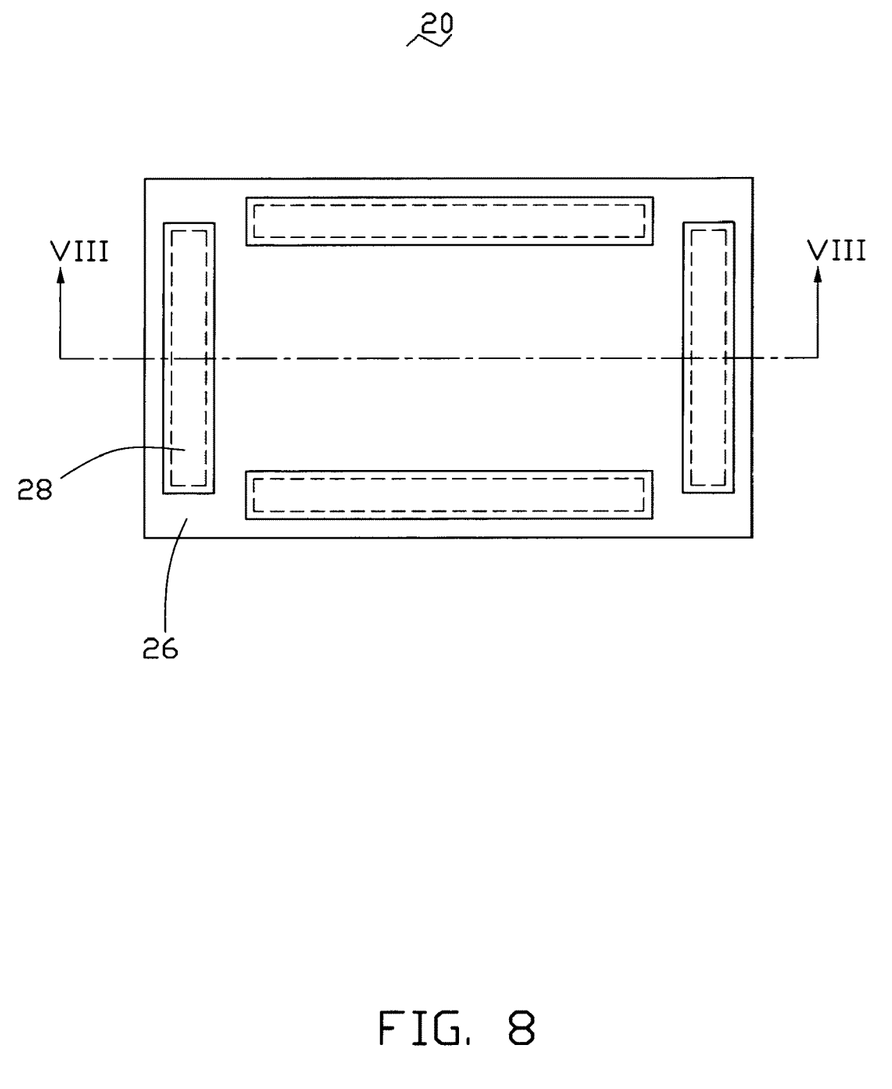
FIG. 8 is an exploded, isometric top view of a touch panel in the PDA according to a second embodiment.
Figure 9:
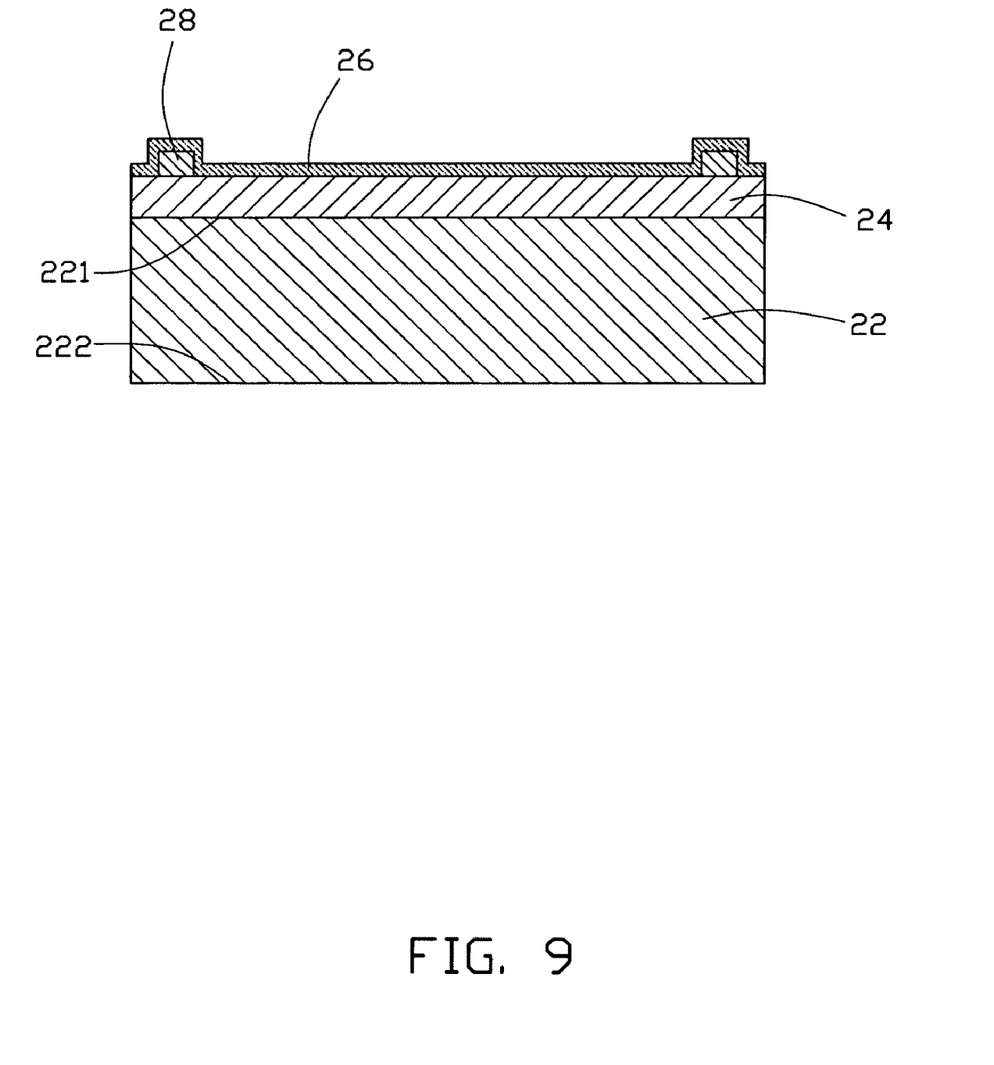
FIG. 9 is a cross-sectional view of the touch panel of FIG. 8 taken along a line of VIII-VIII
Figure 10:
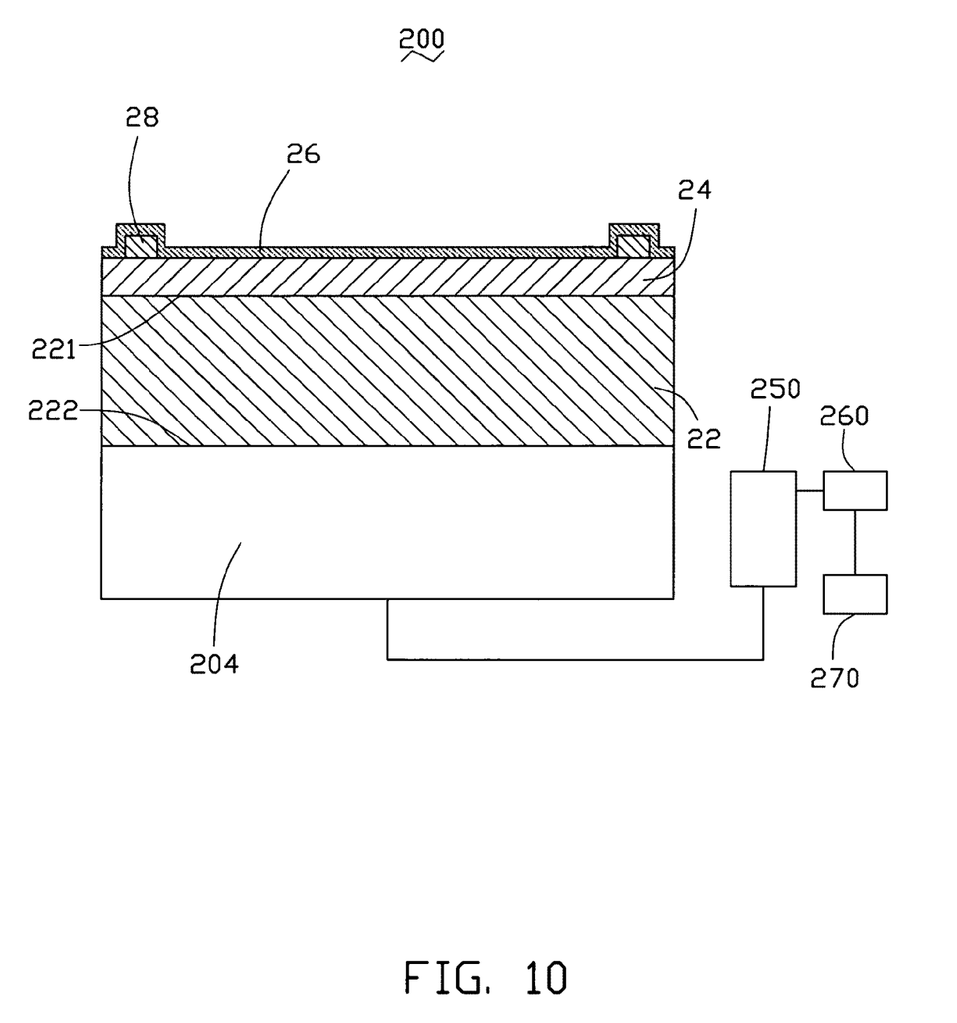
FIG. 10 is a schematic cross-sectional view of the touch panel of the second embodiment used with a display screen, showing operation of the touch panel.

Referring to FIGS. 8 to 10, a PDA 200 in accordance with a second embodiment is provided. The PDA 200 includes a body and a touch panel 20. The body includes a display screen 204. The touch panel 20 is located on a surface of the display screen 204.

The body further includes a central processing unit (CPU) 260, a storage unit 270 and a control unit 250. The central processing unit 260, the storage unit 270, the control unit 250, and the display screen 204 are all located in the body. The storage unit 270, the central processing unit 260 and the control unit 250 can be integrated on an integrated circuit board (not shown). The storage unit 270 and the control unit 250 can be electrically connected to the central processing unit 260 by a conductive wire on the integrated circuit board. The display screen 204 and the touch panel 20 are connected to the control unit 250. The control unit 250 can include a touch panel control unit, a display screen control unit and other functional control units used to control the touch panel 20, the display screen 204 and other functions and devices. The storage unit 270 can be used to store the required data and operation results for the control of central processing unit. The storage unit 270 can further include a read-only memory, a random access memory, and a programmable memory.

The PDA 200 in the second embodiment is similar to the PDA 100 in the first embodiment. The difference is that, the touch panel 20 is a capacitance-type touch panel.

The touch panel 20 includes a substrate 22, a transparent conductive layer 24, a transparent protective layer 26, and at least two electrodes 28. The substrate 22 has a first surface 221 and a second surface 222 at opposite sides thereof. The transparent conductive layer 24 is located on the first surface 221 of the substrate 22. The electrodes 28 are located on the same side as the transparent conductive layer 24 and electrically connected with the transparent conductive layer 24 for forming an equipotential surface on the transparent conductive layer 24. The transparent protective layer 26 covers the electrodes 28 and the exposed surface of the transparent conductive layer 24 that faces away from the substrate 22.

The substrate 22 has a planar structure or a curved structure. The material of the substrate 22 can be selected from the group consisting of glass, quartz, diamond, and plastics. Understandably, the substrate 22 is made from a transparent material, e.g., either flexible or stiff, depending on whether a flexible device is desired or not. The substrate 22 is used to support the transparent conductive layer 24. The substrate 22 can be the same as the first substrate 120 or second substrate 140 of the first embodiment.

The transparent conductive layer 24 includes a carbon nanotube layer. The carbon nanotube layer has substantially a uniform thickness and includes a plurality of carbon nanotubes uniformly distributed therein. The carbon nanotubes are orderly or disorderly distributed in the carbon nanotube layer. Specifically, the carbon nanotube layer can be the same as those disclosed in accordance with the first embodiment.

It is to be noted that the shape of the substrate 22 and the transparent conductive layer 24 can be chosen according to the requirements of the touch filed of the touch panel 20. Generally, the shape of the touch filed may be triangular or rectangular, while other shapes can be used. In the present embodiment, the shapes of the touch filed, the substrate 22, and the transparent conductive layer 24 are all rectangular.

Due to the transparent conductive layer 24 being rectangular in the present embodiment, four electrodes 28 are needed and are formed on the surface thereof, thereby obtaining an equipotential surface. The substrate 22 is a glass substrate. The electrodes 28 are strip-shaped and formed of silver, copper, or any alloy of at least one of such metals. The electrodes 28 are located directly on a surface of the transparent conductive layer 24 that faces away from the substrate 22. The electrodes 28 are formed by one or more of spraying, electrical deposition, and electroless deposition methods. Moreover, the electrodes 28 can also be adhered to the surface of the transparent conductive layer 24, e.g., by a silver-based slurry.

Further, in order to prolong operational life span and restrict coupling capacitance of the touch panel 20, the transparent protective layer 26 is located on the electrodes 28 and the transparent conductive layer 24. The material of the transparent protective layer 26 can, e.g., be selected from a group consisting of silicon nitride, silicon dioxide, benzocyclobutenes, polyester film, and polyethylene terephthalate. The transparent protective layer 26 can be a slick plastic film and receive a surface hardening treatment to protect the electrodes 28 and the transparent conductive layer 24 from being scratched when in use.

In the present embodiment, the transparent protective layer 26 is silicon dioxide. The hardness and thickness of the transparent protective layer 26 are selected according to practical needs. The transparent protective layer 26 is adhered to the transparent conductive layer 24, e.g., via an adhesive.

The touch panel 20 can further include a shielding layer 230 located on the second surface 222 of the substrate 22. The material of the shielding layer 230 can be indium tin oxide, antimony tin oxide, carbon nanotube film, and/or another conductive material. In the present embodiment, the shielding layer 230 is a carbon nanotube film. The shielding layer carbon nanotube film includes a plurality of carbon nanotubes, and the orientation of the carbon nanotubes therein may be arbitrarily determined. In the present embodiment, the carbon nanotubes in the shielding layer carbon nanotube film are arranged along a same direction. The shielding layer carbon nanotube film is connected to ground and acts as a shield, thus enabling the touch panel 20 to operate without interference (e.g., electromagnetic interference).

When the shielding layer 230 is located on the second surface 222 of the substrate 22, a passivation layer 232 can be located on and in contact with a surface of the shielding layer 230 that faces away from the substrate 22. The material of the passivation layer 232 can, for example, be silicon nitride or silicon dioxide. The passivation layer 232 can protect the shielding layer 230 from chemical or mechanical damage.

In operation, voltages are applied to the electrodes 28, by the control unit 250. A user operates the PDA 200 by pressing or touching the transparent protective layer 26 of the touch panel 20 with a touch tool (not shown), such as a finger, or an electrical pen/stylus, while visually observing the display screen 204 through the touch panel 20. Due to an electrical filed of the user, a coupling capacitance forms between the user and the transparent conductive layer 24. For high frequency electrical current, the coupling capacitance is a conductor, and thus the touch tool takes away a little current from the touch point. Currents flowing through the four electrodes 28 cooperatively replace the current lost at the touch point. The quantity of current supplied by each electrode 28 is directly proportional to the distances from the touch point to the electrodes 28. The touch panel control unit in the control unit 250 is used to calculate the proportion of the four supplied currents, thereby detecting coordinates of the touch point on the touch panel 20. Then, the control unit 250 sends the coordinates of the touch point to the central processing unit 260. The central processing unit 260 accepts the coordinates of the touch point, takes out the command corresponding to the pressing point from the storage unit 270, and passes it to the corresponding control unit of the control unit 250.

The control unit 250 controls the display of the display screen 204 according to the command.

The PDA employing the carbon nanotube film has a high transparency, thereby promoting improved brightness to the PDA.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A personal digital assistant, comprising:
a body comprising a display screen; and
a touch panel located on a surface of the display screen, the touch panel being a resistance-type touch panel, and comprising:
a first electrode plate comprising:
a first substrate, a first transparent conductive layer located on a first surface of the first substrate, the first transparent conductive layer comprising a plurality of carbon nanotubes, which are arranged primarily along a first direction, and
two first electrodes that are connected to the first transparent conductive layer; and
a second electrode plate separated from the first electrode plate, and comprising:
a second substrate located adjacent to the display screen;
a second transparent conductive layer located on the second substrate opposite to the first surface; the second transparent conductive layer comprising a plurality of carbon nanotubes, which are arranged primarily along a second direction, the first direction being perpendicular to the second direction; and
two second electrodes that are electrically connected to the second transparent conductive layer.

2. The personal digital assistant of claim 1, wherein the first transparent conductive layer or the second transparent conductive layer comprises at least one carbon nanotube film, and the at least one carbon nanotube film comprises a plurality of successively oriented carbon nanotube segments joined end to end by van der Waals attractive force therebetween, and each carbon nanotube segment comprises a plurality of carbon nanotubes that are combined by van der Waals attractive force therebetween.

3. The personal digital assistant of claim 2, wherein the first transparent conductive layer or the second transparent conductive layer comprises at least two carbon nanotube films stacked on each other.

4. The personal digital assistant of claim 1, further comprising a base;
wherein the touch panel and the display screen are integrated with the base.

5. The personal digital assistant of claim 1, wherein the touch panel further comprises an insulative layer located between the first and second electrode plates, the insulative layer insulates the first electrode plate from the second electrode plate.

6. The personal digital assistant of claim 1, wherein the touch panel further comprises a plurality of dot spacers located between the first transparent conductive layer and the second transparent conductive layer.

7. The personal digital assistant of claim 1, wherein the touch panel further comprises a transparent protective film located on the first substrate, the material of the transparent protective film comprises a material selected from the group consisting of silicon nitride, silicon oxide, benzocyclobutenes, polyester film, and polyethylene terephthalate.

8. The personal digital assistant of claim 1, wherein the touch panel further comprises a shielding layer and a passivation layer located between the second electrode plate and the display screen, the passivation layer is located between the shielding layer and the display screen, and the material of the shielding layer comprises of a material selected from the group consisting of indium tin oxide, antimony tin oxides, and a carbon nanotube film.

9. The personal digital assistant of claim 1, wherein the display screen is selected from the group consisting of liquid crystal display screen, filed emission display screen, plasma display screen, electroluminescent display screen and vacuum fluorescent display screen.

10. The personal digital assistant of claim 1, wherein the body further comprises a central processing unit, a storage unit and a control unit.

11. A personal digital assistant, comprising:
a body comprising a display screen; and
a touch panel located on a surface of the display screen, the touch panel comprising two electrodes and at least one transparent conductive layer comprising at least one carbon nanotube film, wherein each of the at least one carbon nanotube film comprises a plurality of carbon nanotubes substantially oriented along a same direction, two electrodes are electrically connected to the at least one carbon nanotube film, and the two electrodes are located separately on opposite ends of the at least one carbon nanotube film and oriented along a same direction that is perpendicular to the orientation direction of the plurality of carbon nanotubes.

12. The personal digital assistant of claim 11, wherein most of the plurality of carbon nanotubes are joined end-to-end by van der Waals attractive force therebetween.

13. The personal digital assistant of claim 12, wherein the at least one carbon nanotube film comprises a plurality of carbon nanotube films, an angle between aligned directions of the plurality of carbon nanotubes in adjacent carbon nanotube films ranges from about 0 degrees to about 90 degrees.

14. The personal digital assistant of claim 13, an angle defined by a surface of the carbon nanotube film and extending direction of the plurality of carbon nanotubes in the carbon nanotube film ranges from about 0 degrees to about 15 degrees.

15. The personal digital assistant of claim 11, wherein the at least one carbon nanotube film comprises at least two sections comprising the plurality of carbon nanotubes, the plurality of carbon nanotubes in each section are substantially arranged along a same direction.

16. The personal digital assistant of claim 11, wherein the touch panel is a capacitance-type touch panel comprising:
a substrate adjacent to the display screen;
a transparent conductive layer, located on the substrate, comprising a carbon nanotube layer; and
at least two electrodes electrically connected to the transparent conductive layer.

17. The personal digital assistant of claim 11, wherein the touch panel is a resistance-type touch panel.

18. The personal digital assistant of claim 1, wherein the two first electrodes are arranged along the first direction; and the two second electrodes are arranged along the second direction.

* * * * *